Dec. 25, 1962 A. W. HAYDON Re. 25,305

ELECTRIC ROTATING MACHINERY

Original Filed June 9, 1955 2 Sheets-Sheet 1

INVENTOR
ARTHUR W. HAYDON
BY
Pennie, Edmonds, Morton, Barrows & Taylor
ATTORNEYS ELECTRIC ROTATING MACHINERY
Original Filed June 9, 1955 2 Sheets-Sheet 2
Fig. 3.
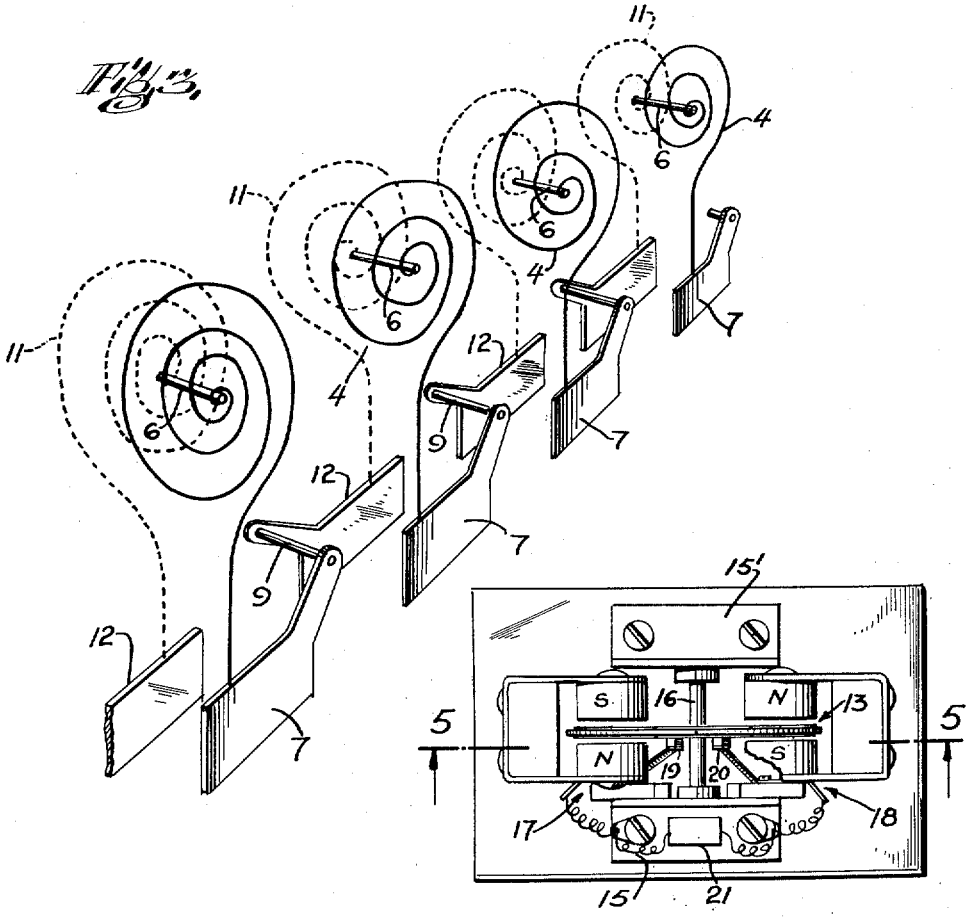
Fig. 4.
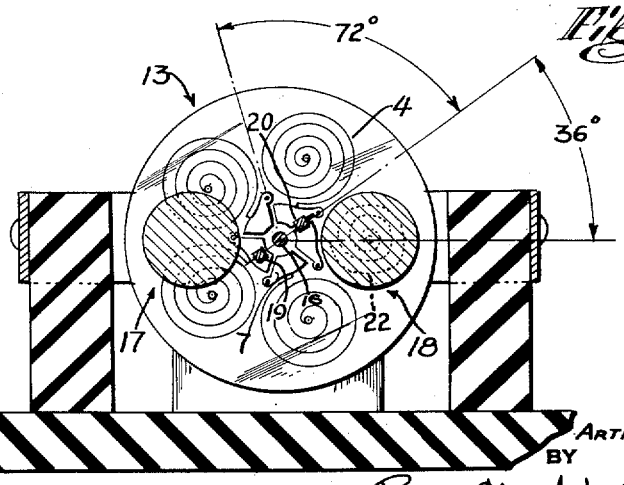
Fig. 5.
INVENTOR
ARTHUR W. HAYDON
BY
Pennie, Edmonds, Morton, Barrows & Taylor
ATTORNEYS United States Patent Office Re. 25,305
Reissued Dec. 25, 1962

25,305

ELECTRIC ROTATING MACHINERY

Arthur W. Haydon, Milford, Conn., assignor to The Haydon Instruments Company, a corporation of Connecticut Original No. 2,847,589, dated Aug. 12, 1958, Ser. No. 514,276, June 9, 1955. Application for reissue June 28, 1960, Ser. No. 39,421
26 Claims. (Cl. 310—268)

Matter enclosed in heavy brackets [ ] appears in the original patent but forms no part of this reissue specification; matter printed in italics indicates the additions made by reissue.

This invention relates to rotating electric machinery and particularly to a disk type rotor for use in such machinery.

Disk type rotors are desirable for many applications in electric rotating machinery because of their small size, adaptability and inexpensiveness. One conventional disk type rotor utilizes eddy currents as a source of motivation, but for many requirements it is desirable that the electric current be restricted to a defined path.

Disk type rotors have therefore been devised which utilize conductive wire windings. In such rotors it is desirable to restrict the thickness dimensions of the rotor and yet utilize the available disk surface area to its utmost.

Conventional wire winding techniques applied to disk type rotors result in undesirable bulk or irregular winding arrangements. If insulated wire is used, suitable wiring arrangements may be obtained but only with the disadvantages of added bulk and expense due to the insulating covering. In addition, the arrangement into a suitable winding pattern usually results in the cross-over of wires adding thickness and lack of symmetry to the winding. It is therefore advantageous to use uninsulated wiring, but with conventional wiring techniques the winding arrangement must be such as to avoid any undesired shorting between wires of the same or separate windings. This enforced adaptation of the winding arrangement may seriously impair the utility of the rotor.

In rotating electric machinery using disk type rotors with conductive wire windings, commutator segments or slip rings are required to permit the leading of the necessary electric current through the winding. The simplicity and compactness of such machinery will, of course, be greatly increased if the commutator segments or slip rings are located on the rotor. It is then only necessary to provide magnetic poles and add conventional brushes to the rotor having both the windings and the conductive sections adapted to lead electric current therethrough in order to complete the rotating electric machine sructure.

My invention therefore comprises a disk rotor utilizing uninsulated conductive windings arranged in a winding pattern which utilizes the available disk area efficently, the shorting of the windings being avoided by a novel interconnection technique which also avoids crossing of conductive wires across the effective winding pattern. In addition, commutation segments or slip rings are arranged on the disk in order to conveniently permit the leading of electric current through the windings.

In accordance with the invention, a winding comprising a strip of conductive material is formed in a continuous geometric patter, which may be a spiral, on a face of a supporting disk made of material having the property of confining the conductive path to said strip, the innermost extreme of said winding being conductively connected to the opposite face of the disk by means of a conductive link passing through the disk. In this manner, short-circuiting, irregularity in pattern, wire crossover, etc., is avoided. The innermost extreme of the winding may advantageously be connected by means of the conductive link directly to the innermost extreme of a similar winding located on the opposite face of the disk, thereby using the surface area of both faces of the disk to advantage. By making the rotational direction of both windings from the innermost extremes thereof identical, as seen from the face upon which each winding is located, and by positioning the windings in substantially opposing relationship, the currents on either side of the disk will for the most part coincide in direction, the combination of the two windings thereby resulting in effect in a single winding.

It is also possible to interconnect windings, for example spiral windings, displaced about either face of the disk in various combinations by crossing from face to face of the disk in the manner described. Either extreme of a spiral may be connected to commutator segments or slip rings located on the disk to permit the introduction of electric current thereto.

It will be understood that the term "spiral" is not restricted to a curvilinear figure but applies to any similar pattern.

While the invention is not limited thereto, I contemplate that the most economical way in which to apply the windings and commutator segments or slip rings to the disk is by one of the known techniques of printed wire circuitry. The use of such techniques is made possible, however, only by reason of my novel rotor construction.

My invention also contemplates the provision of brushes and magnetic poles and a suitable support for supporting the rotor in appropriate relation thereto to complete a rotating electric machine such as a motor.

The invention will be more fully understood by reference to the drawings, which illustrate a number of specific embodiments thereof, taken in conjunction with the following description in which advantageous features thereof will in part be specifically pointed out and in part be obvious.

In the drawings:

FIG. 3 is a distorted straight-line perspective view showing means of interconnection between windings disposed on opposite sides of a rotor, such as that of FIG. 2, the disk being removed to give a better understanding;

FIG. 4 is a top view of a D.C. motor utilizing the rotor of FIG. 1 or FIG. 2; and FIG. 5 is a sectional view of the D.C. motor illustrated in FIG. 4, taken along line 5—5 thereof and dimensioned to indicate the relationship between the poles, brushes and rotor.

Figure 1:
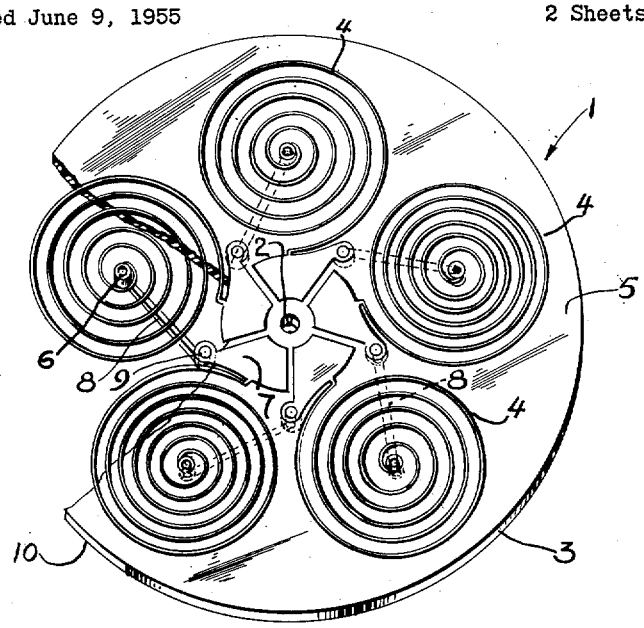
FIG. 1 is a cutaway perspective view of a disk rotor made in accordance with the invention

Referring to FIG. 1, a disk type rotor 1 designed for use in a D.C. motor is shown. The center of rotation is indicated by a hole 2, a shaft being inserted therethrough when prepared for mounting in a rotating machine. Supporting disk 3 may be made of any of many suitable insulating materials and is preferably quite thin. More effective utilization of the magnetic fields created during operation of the rotor as part of a rotating machine may be achieved by the use of a disk made of a magnetic material having an insulating coating to prevent the shorting of windings formed thereon. However, if the resistance to current flow of the magnetic material used is high it may not be necessary to use insulation since the high resistance will confine the current path to the conductive winding. The windings 4 are identical, though they need not be if so desired, each being formed on face 5 of the disk in a continuous spiral. In this embodiment of the invention, the windings are formed on the surface of disk 3 by first coating the disk with copper and then etching away a portion of the copper so that the desired conductive pattern remains.

The insulating disk 3 is perforated at the points where the innermost extremes of the spiral windings terminate and conductive links 6 are passed therethrough. In this manner, the innermost extremes of the spirals can be connected to any desired points without short-circuiting the windings, the connections being made along the opposite face 10 of the disk. The outermost extreme of each spiral is connected to one of a number of commutator segments 7, each commutator segment having a common radial distance from the center of rotation so that fixedly positioned brushes will contact each successively upon rotation of the disk. The commutator segments 7 may be formed on face 5 of disk 3 in the same manner and at the same time as are the spiral windings. The windings 4 are connected in series, the innermost extreme of each spiral being electrically connected to the outermost extreme of the succeeding spiral. The connection to the outermost extreme of each succeeding spiral winding is made by means of conductive links 9 passing through perforations in the disk. Conductive links 6 and 9 are joined together electrically by means of conductive links 8.

The direction of rotation of each winding from the innermost extreme thereof as seen in FIG. 1 is clockwise. For the sake of clarity, it should be understood throughout the specification that the direction of rotation will have as a starting reference the innermost extreme of each spiral and will be that rotational direction which is observed when looking at the face upon which each spiral is located. While FIG. 1 illustrates a specific winding and rotor construction very simi'ar to that actually used in a D.C. motor described hereinafter, it will be evident that many other winding arrangements can be formed by the use of the described winding and interconnection techniques.

Figure 2:
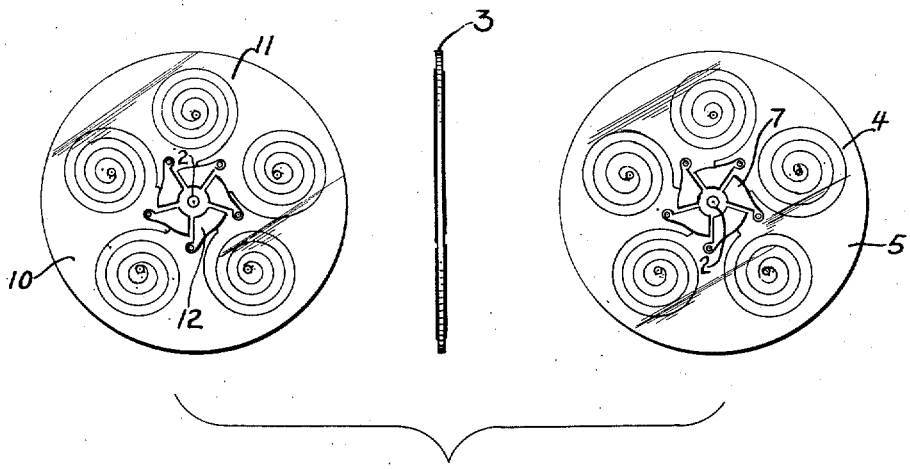
FIG. 2 is a three-part view of a rotor having windings and commutator segments on each side and showing both faces as well as the thickness of the rotor.

FIGS. 2 and 3 illustrate a modification of the arrangement shown in FIG. 1 in which both faces of the disk are used to advantage. In order to show the interconnection between the windings in this modified arrangement, the insulating disk is removed in FIG. 3 and the windings are shown in straight-line arrangement rather than radially about the disk.

In FIG. 2 both faces 5 and 10 of the disk 3 are shown, the relative thickness of the disk being illustrated in the central view. Faces 5 and 10 each have the identical conductive configuration illustrated in FIG. 1, the identifying numerals used in connection with the windings, etc. of face 5 being the same for simplicity in the rotor of FIGS. 2 and 3 as those used in FIG. 1. As shown in FIG. 3, the innermost extremes of windings 4 on face 5 are again connected to the opposite face 10 by means of conductive links 6 passing through perforations in the disk. However, links 6 now lead to the innermost extremes of windings 11 formed on face 10 of the disk. Windings 11 are indicated in FIG. 3 in dotted lines for the sake of clarity. The outermost extremes of windings 11 are connected to their own commutator segments 12 formed on the disk face 10. These in turn are connected through links 9 to commutator segments 7 on the face 5 of the disk. Windings 11 therefore perform the same function performed by links 8 in FIG. 1, in that they act as interconnecting links between succeeding windings on face 5. However, by forming the connecting links in spiral winding form, full utilization of both disk faces is obtained. It is advantageous to have commutator segments on both faces of the disk since the rotor can then be reversed with respect to the brushes in the rotating machine, or the brushes may be mounted to either side of the disk, though such arrangement is not necessary to the function of the rotor. Advantageously the brushes of a brush pair are mounted on opposite sides of the rotor to increase the commutator life and balance out the forces applied to the rotor shaft thereby. Hence one brush of the pair will contact the commutator segments on one face of the disk and the other the commutator segments on the opposite face of the disk. The brushes in this case will of course be radially spaced in the same manner as they would be were they to be positioned on the same side of the rotor. Another advantage of this positioning of the brushes is that any graphite particle built up between the commutator segments as a result of graphite particles wearing off the brushes will be minimized. In addition, the possibility of short circuiting between the brushes will be substantially reduced.

By arranging the windings in FIGS. 2 and 3 which are connected together at their innermost extremes by links 6 in substantially opposing relationship, and having the spirals formed in the same rotational direction (when viewed as previously indicated from their respective disk faces), the current flow at opposing points of said windings will for the most part be in the same direction. Therefore, the two windings will act effectively as one though separated by the insulating disk.

FIGS. 4 and 5 illustrate a D.C. motor utilizing a disk rotor 13 of the type shown either in FIG. 1 or FIGS. 2 and 3. The disk rotor is mounted between two bracket supports 15 and 15' by means of shaft 16 which passes through its center of rotation. Magnets 17 and 18 are illustrated but for the first part of the following description magnet 17 will not be considered. The north and south poles of magnet 18 are disposed on opposite sides of the disk. The field created by these poles is preferably perpendicular to the face of the disk. Preferably the poles of the magnet have an outside diameter approximately equal to or slightly larger than the outside diameter of the spiral windings 4 of the rotor, thereby creating an effective magnetic field which passes through the entire winding directly between the poles without affecting adjacent windings. It should be understood however that the poles are not restricted to the configuration shown and may include other geometric forms as befits a particular application.

The configuration of rotor 13, as illustrated in FIG. 5, is such that the radially disposed windings each occupy a 72° sector of the disk. The commutator segment associated with each winding is located in the same sector therewith. The rotor therefore is divided into equal adjacent sectors, each sector having a commutator segment spiral winding combination arranged therein. Brush 20 is positioned at an angle of 36° away from the line passing through the center of rotation of the disk and the center of the poles. Brush 19 is placed 180° away from brush 20, but if magnet 18 alone is used, brush 19 is not necessarily restricted to this position. A D.C. battery 21 is connected to the brushes to supply the necessary electric current thereto.

The operation of the motor will first be described by considering the action of the magnetic field created by magnet 18 upon the spiral winding 22 shown positioned directly between the pole faces of magnet 18. Because of the spiral configuration current flow through winding 22 will be opposite in direction in the half-sections of the winding located on opposite sides of an imaginary line bisecting the 72° sector in which winding 22 is centrally located. When the rotor is positioned so that the imaginary sector bisecting line is below the pole-center of rotation line, the half-section above the bisecting line will be under the influence of the magnetic field to a greater degree than the other half-section. As a result, the direction of rotor rotation will be influenced by the current direction in that half-section. The situation is reversed when the bisecting line is above the pole-center of rotation line, the greater influence being exerted by the half-section below the sector bisecting line. In order to maintain a unidirectional rotating force on the rotor, the current direction in the half-section having the greater influence must remain the same with respect to the magnetic field. A current reversal through the winding is therefore required when the sector bisecting line coincides with the pole-center of rotation line. This current reversal is obtained by proper positioning of the brushes with respect to the commutator segment and pole-center of rotation line configuration.

Because the windings of the rotor 13 are connected in series, a brush contacting two adjacent commutator segments will short-circuit the windings connected between the two said segments. With the arrangement shown in FIG. 5 a brush 20 located 36° above the pole-center of rotation line will short circuit spiral winding 22 positioned directly between the poles of magnet 18 with its sector bisecting line and the pole-center of rotation line coinciding, and will produce current reversal through the winding when its sector bisecting line passes from one side to the other of the pole center of rotation line. The same effect occurs in each of the windings because of the symmetrical configuration of the rotor.

When two sets of poles are used, it is desirable that the pairs of poles be located 180° away from one another, as illustrated by magnets 17 and 18 in FIGS. 4 and 5. To account for the change of current direction 180° around the rotor, the magnetic field established by magnet 17 must be in the opposite direction with respect to the magnetic field established by magnet 18. When two such pairs of poles are used, brush 19 is positioned 180° away from brush 20. With this configuration forces in the same rotational direction will be established by the two magnetic fields, the action of both fields being identical. The use of two poles also insures that the motor will be self starting regardless of the rotor position.

The brush, commutator segment, pole relationship indicated in FIG. 5 with respect to a rotor having the same winding configuration illustrated in FIG. 1 or FIGS. 2 and 3, can be generalized to include any number of equal sectors. A D.C. motor utilizing a disk rotor having n equal sectors will operate in the same manner as described in conjunction with FIGS. 4 and 5 if brushes are positioned from the pole-center of rotation line by an angle of 360° divided by 2n.

It will be understood that the embodiment shown in FIGS. 4 and 5 can be altered to meet the need of a particular application without departing from the scope of the invention. The configuration of the winding-commutator segment arrangement can be changed to meet a particular requirement. For example, for convenience in brush location it may be desirable to position the commutator segments elsewhere than in the sectors occupied by the windings. The brush and magnet pole configuration may also be altered or various combination of brush and pole configurations may be used. Different magnetic structures may be utilized if desired, as for example a disk type magnet with localized pole portions.

While specific embodiments have been described to illustrate the invention, it will be evident that modifications may be made without departing from the scope of the invention, as set forth in the appended claims.

Where the term "spiral" has been used hereinbefore and is used in the appended claims, it is intended to include within its meaning, in addition to a true spiral, any continuous geometric pattern in which lines do not intercept. Where the direction of the spiral is referred to, in both cases also, it is intended to mean the direction when the spiral is viewed from a point off the face of the disk upon which the spiral is supported.

I claim:

1. A disk rotor for an electric rotating machine having a supporting disk made of insulating material, a plurality of windings located radially about said disk between the center and circumference thereof in adjacent non-overlapping sectors each winding comprising a strip of conductive material formed into a continuous spiral, the direction of said spiral in all windings being identical, conductive links connecting said windings together in series by connecting the innermost extreme of each winding to the outermost extreme of the succeeding winding, each link passing between said extremes at least partially along the face of the disk opposite that face upon which one of the windings is formed, the passage of said links from face to face being made through perforations in the disk, and a plurality of commutator segments each electrically connected to a separate spiral winding, said commutator segments being located on a face of said disk radially about the center of rotation of said disk in adjacent non-overlapping sectors, and each having a common radial distance from said center of rotation.

2. A disk rotor for an electric rotating machine in accordance with claim 1 in which each spiral winding and its associated commutator segment occupy substantially the same sector of the disk, the plurality of winding-commutator segment combinations being radially disposed about the disk in equal adjacent sectors.

3. A rotor for an electric rotating machine comprising a plurality of planar windings radially disposed about the center of rotation of the rotor in adjacent non-overlapping sectors, each winding comprising a strip of conductive material formed into a continuous spiral, the direction of said spiral in all windings being identical, conductive links connecting said windings together in series by connecting the innermost extreme of each winding to the outermost extreme of the succeeding winding, the passage of each link between said extremes being at least partially made in a plane other than the plane occupied by each of the windings connected by said link, a plurality of planar commutator segments each electrically connected to a separate spiral winding, said commutator segments being arranged in the same plane radially about the center of rotation in non-overlapping adjacent sectors, each commutator segment having a common radial distance from said center of rotation, and means for retaining said windings and commutator segments with respect to the center of rotation.

4. A disk rotor for an electric rotating machine having a supporting disk made of insulating material, a plurality of pairs of windings, each comprising a strip of conductive material formed on a face of said disk in a continuous spiral, the windings of each pair being located on opposite faces of said disk in substantially coaxial relationship, the direction of said spiral in all windings being identical, a plurality of commutator segments each electrically connected to the outermost extreme of a separate spiral winding and located on the same face therewith, each pair of spiral windings and the associated commutator segments occupying substantially the same sector of the disk, the plurality of pairs of winding-commutator segment combinations being radially disposed about said disk in equal adjacent non-overlapping sectors, the commutator segments located on the same face of the disk having a common radial distance from the center of rotation of said disk, and conductive links connecting the plurality of windings in series, the innermost extreme of a winding of each pair being connected to the innermost extreme of the other winding of the same pair, the outermost extreme of a winding of a pair located on one face of said disk being connected to the outermost extreme of that winding of a succeeding pair that is located on the opposite face of said disk, said conductive links passing from face to face through perforations in the disk.

5. A D.C. electric rotating machine comprising a disk rotor having a supporting disk made of insulating material, n windings located radially about said disk between the center and circumference thereof in equal adjacent non-overlapping sectors, each winding comprising a strip of conductive material formed into a continuous spiral, the direction of said spiral in all windings being identical, conductive links connecting said windings together in series by connecting the innermost extreme of each winding to the outermost extreme of the succeeding winding, each link passing between said extremes at least partially along the face of the disk opposing that face upon which one of the windings is located, the passage of said links from face to face being made through perforations in the disk, and n commutator segments each electrically connected to a separate spiral winding, said commutator segments being located on a face of said disk radially about the center of rotation of said disk in equal adjacent non-overlapping sectors, each commutator segment having a common radial distance from said center of rotation; a magnetic structure having a north and a south pole, said poles being disposed on opposite sides of the disk so that the windings may pass therebetween; and a pair of brushes arranged to contact said commutator segments, at least one of said brushes being set at an angle of 360°/2n from a line passing through the center of the poles and the center of rotation of the disk so as to short-circuit the winding positioned directly between the poles.

6. A D.C. electric rotating machine in accordance with claim 5 in which the effective magnetic field created by the poles is approximately equal in outside diameter to the outside diameter of the spiral windings.

7. A D.C. electric rotating machine in accordance with claim 5 in which n is equal to an odd number.

8. A disk rotor for an electric rotating machine in accordance with claim 1 in which the plurality of spiral windings are radially disposed about the disk in equal adjacent sectors, and the commutator segments are radially disposed about the face of the disk in equal adjacent sectors.

9. A D.C. electric rotating machine comprising a disk rotor having a supporting disk made of insulating material, a plurality of windings radially disposed about said disk between the center and circumference thereof in adjacent non-overlapping sectors, each winding comprising a strip of conductive material formed into a continuous spiral, the direction of said spiral in all windings being identical conductive links connecting said windings together in series by connecting the innermost extreme of each winding to the outermost extreme of the succeeding winding, each link passing between said extremes at least partially along the face of the disk opposing that face upon which one of the windings is formed, the passage of said links being made through perforations in the disk, and a plurality of commutator segments each electrically connected to a separate spiral winding, said commutator segments being located on a face of said disk radially about the center of rotation of said disk in adjacent non-overlapping sectors, each commutator segment having a common radial distance from said center of rotation; a magnetic structure having a north and a south pole, said poles being disposed on opposite sides of the disk so that the windings may pass therebetween; and a pair of brushes arranged to contact said commutator segments, said brushes and commutator segments being adapted and arranged to short-circuit each winding when it is located substantially within the total effective magnetic field of the said poles.

10. A D.C. electric rotating machine in accordance with claim 9 in which the effective magnetic field created by said poles is approximately equal in outside diameter to the outside diameter of the spiral winding.

11. A D.C. electric rotating machine in accordance with claim 5 in which each said spiral winding and its associated commutator segment occupy the same sector of the disk, the plurality of winding-commutator segment combinations being radially disposed about the face of the disk in equal adjacent non-overlapping sectors.

*12. In a D.C. motor, a disc-shaped rotor comprising a disc of insulating material, printed-circuit winding means on said disc, said winding means including printed-circuit conductors on each face of said disc arranged in the shape of substantially closed continuous geometric figures, a terminal for each said winding means within each said figure, means extending through said disc interconnecting pairs of said terminals on opposite faces of said disc, and printed-circuit commutator means on said disc formed at the ends of at least some of said winding means outside said geometric figures.*

*13. A D.C. electric rotating machine comprising a stator for producing a magnetic field, a rotor having a supporting disc of insulating material, printed conductor means disposed on the opposite surfaces of said disc, each of said conductor means having a first terminal portion near the center portion of said disc and a second terminal portion located farther out from the center of said disc than is said first terminal portion, connecting conductor means extending substantially directly from one surface of said disc to the other and connecting the first terminal portion of the conductor means on one surface of said disc with the first terminal portion of the conductor means on the opposite surface of said disc, and connecting the second terminal portion of the conductor means on the first surface of said disc with the second terminal portion of the conductor means on the opposite surface of said disc, said conductor means, with the exception of said connecting means, lying substantially in two planes on the opposite surfaces of said disc, said conductor means forming an operative geometric arrangement of non-intercepting conductors for conducting current along paths to provide unidirectional net torque on said rotor in said magnetic field.*

*14. In an electric rotating machine, a rotor disc formed of insulating material, printed conductor means disposed on at least a first surface of said rotor disc, each of said printed conductor means having a first end portion near the center portion of the disc and a second end portion nearer to the outer portion of said disc than are said first end portions, connecting conductors connected to said second end portions and extending substantially directly through said disc to the other surface thereof, additional printed conductor means on the opposite surface of said disc connected to said connecting conductors to form an operative geometric arrangement of non-intercepting conductors, said first-mentioned printed conductor means lying in a first single plane and said additional printed conductor means lying in a second single plane, printed commutator means on a surface of said disc and connected to certain ones of said printed conductor means, magnetic stator means associated with said rotor disc, and brush means positioned to engage said printed commutator means to energize said printed commutator means and said printed conductors.*

*15. Apparatus according to claim 14 in which said printed conductor means are arranged in a pattern in the shape of a substantially closed, generally repetitive geometric figure.*

*16. Apparatus according to claim 14, in which said printed conductor means are in the shape of a plurality of windings on each face of said disc, each winding being in the shape of a substantially closed, continuous geometric figure having one end portion within the figure and one end portion outside the figure.*

*17. Apparatus according to claim 14, in which said printed conductor means are in the shape of a plurality of windings on each face of said disc, one end portion of each of said windings being located approximately midway between said commutator means and the outer edge of said disc.*

*18. In a D.C. motor, a disc-shaped printed circuit rotor, having uninsulated printed-circuit conductor means on its opposite surfaces connected together to form composite winding means distributed on the two surfaces with crossings from surface to surface of said disc-shaped rotor, said winding means being in the shape of a continuous geometric arrangement of non-intercepting lines, portions of said printed circuit conductor means comprising commutator means on at least one face of said rotor.*

*19. In a D.C. motor, a disc-shaped rotor comprising a disc of insulating material, printed-circuit winding means on said disc, and printed-circuit commutator means on said disc connected to said winding means, connected so as to energize selected portions of said winding means in succession, said printed-circuit winding means being in the shape of a substantially closed continuous geometric figure and having terminal means within said figure and additional terminal means without said figure.*

*20. A disc rotor for an electric rotating machine, said rotor comprising a supporting disc of insulating material, a plurality of printed-circuit windings located on each of the faces of said disc in adjacent non-overlapping sectors, each winding comprising a strip of conductive material formed into a substantially closed continuous geometric figure comprising non-intercepting lines, conductive links connecting together pairs of windings on opposite faces of said disc, a plurality of commutator segments, and printed circuit means on said disc for connecting said commutator segments to the ends of at least some of said windings at points without said closed continuous geometric figures.*

*21. In a D.C. electric rotating machine, a rotor having a supporting disc comprising insulating material, printed conductor means disposed on the opposite surfaces of said disc and forming conductor portions, each of said conductor means having a first end portion near the center portion of the disc and a second end portion located farther out from the center portion of the disc than is said first end portion, printed-circuit commutator means on at least one face of said disc, means interconnecting said commutator means with at least some of said first end portions of said conductor means, connecting conductor means extending substantially directly from one surface of the disc to the other surface and connecting the second end portion of each conductor portion on one surface of said disc with the second end portion of a conductor portion on the opposite surface of said disc, said conductor portions forming windings in a geometric pattern of non-intercepting lines, said conductor means, with the exception of said connecting conductor means, lying substantially in two planes on the opposite surfaces of said disc.*

*22. In a D.C. motor, a permanent-magnet stator establishing flux in one direction in at least one zone and in another direction in at least one other zone, a disc-shaped printed circuit rotor mounted for rotation through said flux zones, said rotor having printed conductors on its opposite surfaces connected together to form composite winding means distributed on the two surfaces wtih crossings from surface to surface, said rotor having a plurality of sectors angularly displaced from one another, said composite winding means forming a pair of windings substantially entirely within each sector, there being a greater number of said sectors of said rotor than of said flux zones established by said stator, the conductors of said rotor, except for said connections from surface to surface, lying substantially entirely in the two planes of said two surfaces of said disc, portions of said winding means being in the shape of a substantially closed continuous geometric figure and having terminal means within said figure and additional terminal means without said figure, a plurality of commutator segments, and printed circuit means on said disc interconnecting said commutator segments with said composite winding means.*

*23. In a D.C. motor including means forming a magnetic flux field, a rotor disc for rotation in said field comprising a plurality of winding means, said winding means having one portion thereof formed of printed conductor means on one surface of said disc and another portion thereof formed of printed conductor means on the opposite surface of said disc, conductive links passing from face to face through said disc so as to connect said printed conductor means on one of said surfaces to said printed conductor means on the opposite surface, and commutator means mounted on a face of said disc and connected to said winding means for supplying current thereto selectively, said printed conductor means and links forming paths for said current shaped to provide unidirectional torque for rotating said rotor, said printed conductor means on one of said surfaces being connected and positioned in relation to said printed conductor means on the opposite surface of said disc to cause magnetic flux produced by said printed conductor means on one of said surfaces to aid the magnetic flux produced by said printed conductor means on the opposite side of said disc.*

*24. In a D.C. motor having a stator for providing a substantially steady magnetic field which differs in direction in different zones, a printed circuit rotor for rotation through said zones, comprising a disc at least the surfaces of which are of insulating material, a plurality of spaced-apart uninsulated non-intercepting lengths of conductive printed circuitry on each face of said disc, a commutator for receiving direct current and comprising segments of printed circuitry on said disc, and means including conductive links connecting individual ones of said uninsulated lengths of conductive printed circuitry on one face of said rotor disc in series with individual ones of those on the other face of said disc and with individual ones of said printed commutator segments, to form composite winding means having one portion on one face of said disc and another portion on the opposite face thereof arranged so as to lead said direct current from said commutator along paths including said printed circuitry with crossings from face to face of said disc to enable said circuitry to be oriented in relation to said field to provide unidirectional rotating force on said rotor while avoiding undesired shorting of said uninsulated circuitry.*

*25. In an electric rotating machine, a disc-shaped rotor having, on a first side thereof, a set of winding portions comprising printed circuit conductors all lying substantially in a single plane, a commutator on said rotor, each of said winding portions having a plurality of terminals, printed circuit means on said disc interconnecting said commutator with said winding portions, one terminal of each said winding portion being located at a point intermediate said commutator and the outer edge of said rotor, and, on the opposite side of said disc, an additional set of printed circuit winding portions connected to said first set through said last-mentioned terminals so that current from said commutator passes through a given winding portion on said first side of said disc and thereafter passes through another winding portion on said second side of said disc.*

*26. Apparatus according to claim 25, said winding portions having the shape of a substantially closed continuous geometric figure and having a terminal within said figure and a terminal without said figure.*

References Cited in the file of this patent or the original patent

UNITED STATES PATENTS

| | | |
|---|---|---|
| 243,747 | Wood | July 5, 1881 |
| 306,687 | Horry | Oct. 14, 1884 |
| 685,313 | White | Oct. 29, 1901 |
| 1,018,141 | Viall | Feb. 20, 1912 |
| 1,647,474 | Seymour | Nov. 1, 1927 |
| 2,066,511 | Arlt | Jan. 5, 1937 |
| 2,441,960 | Eisler | May 25, 1948 |
| 2,773,239 | Parker | Dec. 4, 1956 |
| 2,818,518 | Phaneuf et al. | Dec. 31, 1957 |

FOREIGN PATENTS

| | | |
|---|---|---|
| 389,450 | Great Britain | Apr. 13, 1933 |